United States Patent [19]
Yasui et al.

[11] Patent Number: 5,465,618
[45] Date of Patent: Nov. 14, 1995

[54] THERMAL FLOW SENSOR AND HEAT-SENSITIVE RESISTOR THEREFOR

[75] Inventors: Katsuaki Yasui; Yuji Kishimoto, both of Himeji, Japan

[73] Assignee: Mitsubishi Denki Kabushiki Kaisha, Tokyo, Japan

[21] Appl. No.: 403,133

[22] Filed: Mar. 13, 1995

Related U.S. Application Data

[63] Continuation of Ser. No. 52,673, Apr. 27, 1993, abandoned.

[30] Foreign Application Priority Data

Apr. 30, 1992 [JP] Japan .................................. 4-111535

[51] Int. Cl.$^6$ ...................................................... G01F 1/68
[52] U.S. Cl. ...................... 73/204.27; 73/204.26; 73/118.2
[58] Field of Search .................. 73/204.18, 204.25, 73/204.26, 204.27, 204.19, 118.2; 338/22 R, 22 SD, 308

[56] References Cited

U.S. PATENT DOCUMENTS

| | | | |
|---|---|---|---|
| 3,696,294 | 10/1972 | Krupka | 324/105 |
| 4,559,814 | 12/1985 | Sato et al. | 73/204.27 |
| 4,628,743 | 12/1986 | Miller et al. | 73/204.25 |
| 5,033,299 | 7/1991 | Tanaka et al. | 73/204.26 |
| 5,060,511 | 10/1991 | Sakaue et al. | 73/204.26 |
| 5,094,105 | 3/1992 | Emmert et al. | 73/204.25 |

FOREIGN PATENT DOCUMENTS

| | | |
|---|---|---|
| 1490546 | 9/1969 | Germany . |
| 2720049 | 11/1978 | Germany . |
| 3108021 | 10/1982 | Germany . |

OTHER PUBLICATIONS

ATM Archive Fur technisches Messen, Sep. 1955, pp. 209–212.

Primary Examiner—Richard Chilcot
Assistant Examiner—Harshad Patel
Attorney, Agent, or Firm—Sughrue, Mion, Zinn, Macpeak & Seas

[57] ABSTRACT

A thermal flow sensor comprising a heat-sensitive electrical resistor having a substantially uniform temperature profile so that the heat radiation which causes a measurement error is decreased. The resistor element of the resistor comprises a main heat-sensitive section having a first resistance temperature coefficient and a thermal bullet section having a second resistance temperature coefficient greeter than the first temperature coefficient by at least 1,000 ppm, the thermal buffer section being positioned in the vicinity of the support means. The first temperature coefficient may be a negative value and the second temperature coefficient may be a positive value and the base member may be made of zirconia. Alternatively, the thermal flow sensor of the present invention may comprises the heat-sensitive resistor element which has a negative resistance temperature coefficient along its entire length.

10 Claims, 6 Drawing Sheets

THERMAL FLOW SENSOR AND HEAT-SENSITIVE RESISTOR THEREFOR

This is a continuation of application Ser. No. 08/052,673 filed Apr. 27, 1993 abanoned.

BACKGROUND OF THE INVENTION

This invention relates to a thermal flow sensor and a heat-sensitive resistor therefor.

Hitherto, a method of detecting the flow of a fluid from the equilibrium state of a bridge circuit including a heat-sensitive resistor disposed in the fluid flow has been applied to thermal flow sensors such as that disclosed in Japanese Utility Model Laid-Open No. 61-108930. A description will be given, with reference to some of the drawings, of a conventional air flow sensor in which a head-sensitive resistor is employed as a heating resistor which comprises a ceramic substrate and a platinum thin-film resistor formed on the substrate.

FIG. 11 schematically shows the arrangement of the conventional thermal flow sensor in which a heat-sensitive resistor is provided. As shown in the figure, a sensor tube 2 is provided at a predetermined position within a housing 1 defining the main passage of a fluid. A heat-sensitive electrical resistor 3 and an air temperature sensor 4 are disposed on the sensor tube 2. Each of the group consisting of the heat-sensitive resistor 3 and a resistor R2 and the group consisting of the air temperature sensor 4 and another resistor R1 is connected in series and these elements form a bridge circuit.

The heat-sensitive electrical resistor 3 has a structure such as that shown in FIGS. 12 and 13 which will be described in detail later. The thermal flow sensor shown in FIG. 11 also includes a control circuit in which the junction 7 between the heat-sensitive resistor 3 and the air temperature sensor 4, partially forming the bridge circuit, is connected to the emitter of a transistor 102, Also in this circuit, the junction 5 between the heat-sensitive resistor 3 and the resistor R2, and the junction 6 between the air-temperature sensor 4 and the resistor R1 are connected to the input terminals of a differential amplifier 101. The output of the differential amplifier 101 is applied to the base of the transistor 102. The collector of the transistor 102 is connected to the positive electrode of a d.c. power source 103, the negative electrode of the power source 103 being grounded.

FIGS. 12 and 13 are a front view and a side view, respectively, of the heat-sensitive electrical resistor 3 shown in FIG. 11. In these figures, the heat-sensitive electrical resistor 3 comprises an electrically insulating elongated base plate 31 supported at one end thereof by the detection tube 2. The base plate 31 is made of alumina. The base plate 31 has attached thereon a heat-sensitive resistor element 32 including a sepertine portion 33 made of a heat sensitive resistor material such as platinum having a resistance which changes with temperature at a positive temperature coefficient. The heat-sensitive resistor element 32 is provided with a pair of lead lines 34 and coated with a protective coating 35.

The operation of the thermal flow sensor having the above-described construction is already known, so that the operation will not be described in detail, and it will be only briefly outlined, When the voltage at the junction 6 and that at the junction 5 have become equal to each other, the bridge circuit achieves its equilibrium state. When a fluid such as air flows through the detection housing 1, the bridge circuit is maintained at its equilibrium state by adjusting the current supplied to the bridge circuit so that the mean temperature of the heat-sensitive resistor element 32 of the heat-sensitive resistor 3 is at a temperature higher than the temperature of the fluid by a predetermined amount. When the fluid speed increases in this state, the heat-sensitive resistor element 32 is cooled and its resistance increases, whereby the equilibrium state of the bridge circuit is destroyed. At this time, the control circuit causes the current supplied to the bridge circuit to increase to additionally heat the heat-sensitive resistor element 32 so that its mean temperature is returned to its initial value, whereby the equilibria state of the bridge circuit is recovered and the flow speed of the fluid can be obtained from the supplied current amount.

However, in the conventional thermal flow sensor, the heat generated at the heat-sensitive resistor element 32 is dissipated not only into the fluid contacting the resistor element 32 but also into the support structure such as the detection tube 2 through the supported end. Therefore, the temperature profile of the heat-resistive electric resistor 3 is as shown in FIG. 14, from which it is seen that the temperature of the resistor 3 substantially linearly changes according to the height position h0 through h5 from the highest temperature Tmax at its free end to the lowest temperature at its supported end. Since the heat-sensitive resistor element 32 is made of a material such as platinum having a positive temperature coefficient of resistance, the higher-temperature portion of the resistor element 32 has a higher resistance and is further heated and the lower-temperature portion of the resistor element 32 has a lower resistance which provides a lower temperature, so that the temperature difference is increased between the highest temperature $T_{max}$ of the resistor element 32 and the mean temperature $T_{mean}$. This tendency is further increased when the base plate 31 is made of a good thermally conductive material such as alumina.

On the other hand, since the mean temperature of the heat-sensitive resistor element 32 is controlled at a constant temperature by the control circuit, the local highest temperature $T_{max}$ of the heat-sensitive resistor element 32 is increased when the difference between the highest temperature $T_{max}$ and the mean temperature $T_{mean}$ is large. In the thermal flow sensor, the heat of the heat-sensitive resistor 3 is also dissipated by heat radiation. Since the amount of heat radiation proportionally increases by the fourth power of the absolute temperature of matter, the amount of heat radiation can be considered dependent upon the local highest temperature $T_{max}$. Accordingly, with the above-arrangement in which the highest temperature $T_{max}$ is high, the measurement error is large due to the heat radiation. Also, since the proportion of the heat dissipated by conduction through the supported end from the heat-sensitive resistor 3 to the total generated heat in the heat-sensitive resistor 3 changes in accordance with the flow rate of the fluid, the temperature profile or the distribution on the resistor 3 varies in accordance with the fluid speed. Therefore, when the fluid speed changes abruptly, the operation of the control circuit is transitional and no normal correct output can be obtained until the temperature profile of the heat-sensitive resistor 3 reaches a stable temperature profile corresponding to the flow rate at that time.

Thus, in the conventional heat-sensitive resistor as above described, the highest temperature $T_{max}$ is relatively high as compared to the mean temperature $T_{mean}$ of the heat-sensitive resistor element 32, so that the measurement error due to the effect of the heat radiation from the heat-sensitive resistor 3 is large and the abrupt change in flow rate cannot

SUMMARY OF THE INVENTION

Accordingly, one of the objects of the present invention is to provide a heat-sensitive electrical resistor suitable for use in a thermal flow sensor free from the above-described drawbacks of the conventional thermal flow sensor.

Another object of the present invention is to provide a heat-sensitive electrical resistor suitable for use in a thermal flow sensor in which the measurement error due to the heat radiation from the heat-sensitive resistor can be made small and which has a good response.

Another object of the present invention is to provide a thermal flow sensor in which the measurement error due to the heat radiation from the heat-sensitive resistor can be made small and which has a good response.

With the above objects in view, the present invention resides in a thermal flow sensor comprising a heat-sensitive electrical resistor having an electrically insulating base member, a heat-sensitive resistor element disposed on the support member and having a resistance which changes with temperature at a predetermined temperature coefficient; support means for supporting the base member within e flow stream of a fluid; a bridge circuit including the heat-sensitive resistor and a plurality of other resistors; and a control circuit for controlling the bridge circuit in such a manner that the bridge circuit maintains a predetermined equilibrium state and for detecting the flow of the fluid from the equilibrium state; the beat-sensitive resistor element comprising a main heat-sensitive section having a first resistance temperature coefficient and a thermal buffer section having a second resistance temperature coefficient greater then the first temperature coefficient, the thermal buffer section being positioned in the vicinity of the support means.

The first resistance temperature coefficient may be a negative value and the second resistance temperature coefficient may be a positive value or, alternatively, the heat-sensitive resistor element may have a negative resistance temperature coefficient over its entire length. The heat-sensitive resistor may be an elongated member supported either by the support means at only one end or at opposite ends. Alternatively, the heat-sensitive resistor element may include a main heat-sensitive section layer and a thermal buffer section layer which are electrically connected together and attached directly on the base member. The base member may be an elongated cylindrical member and the heat sensitive resistor element may be a coil disposed around the cylindrical base member.

The present invention also resides in a heat-sensitive electrical resistor suitable for use in the above thermal flow sensor.

BRIEF DESCRIPTION OF THE DRAWINGS

The present invention will become more readily apparent from the following detailed description of the preferred embodiment of the present invention taken in conjunction with the accompanying drawings, in which.

DESCRIPTION OF THE PREFERRED EMBODIMENTS

Figure 1:
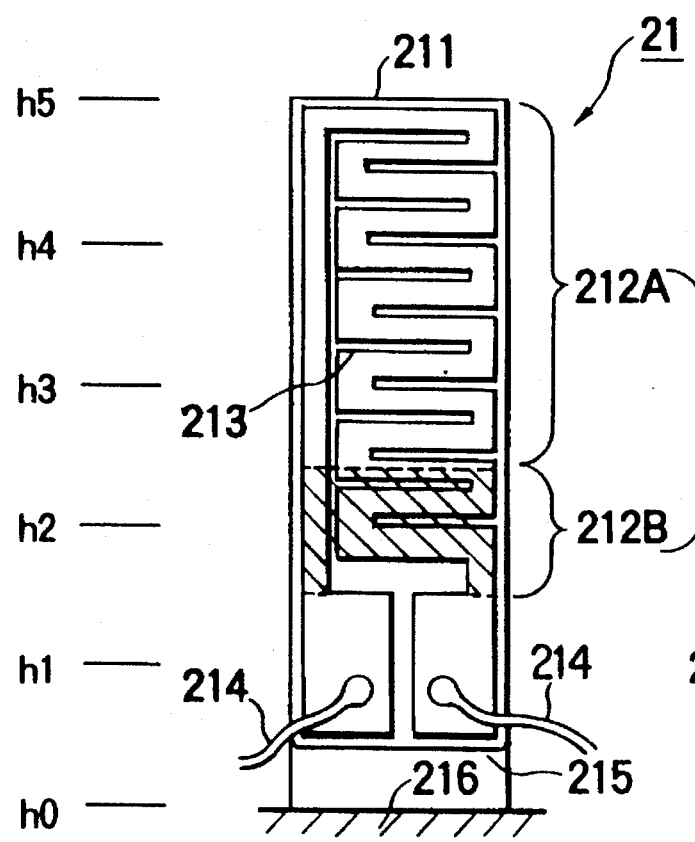
FIG. 1 is a front view of the heat-sensitive electrical resistor of one embodiment of the present invention for use in a thermal flow sensor such as illustrated in FIG. 11.
Figure 2:
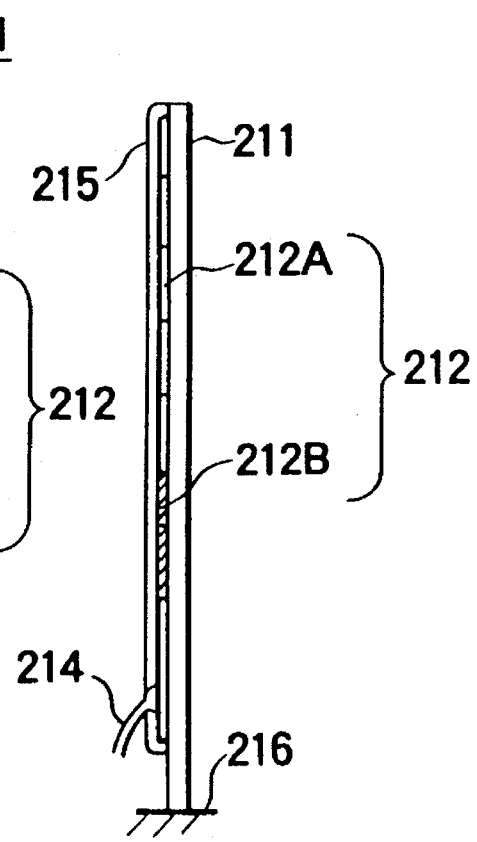
FIG. 2 is a side view of the heat-sensitive electrical resistor illustrated in FIG. 1.
Figure 11:
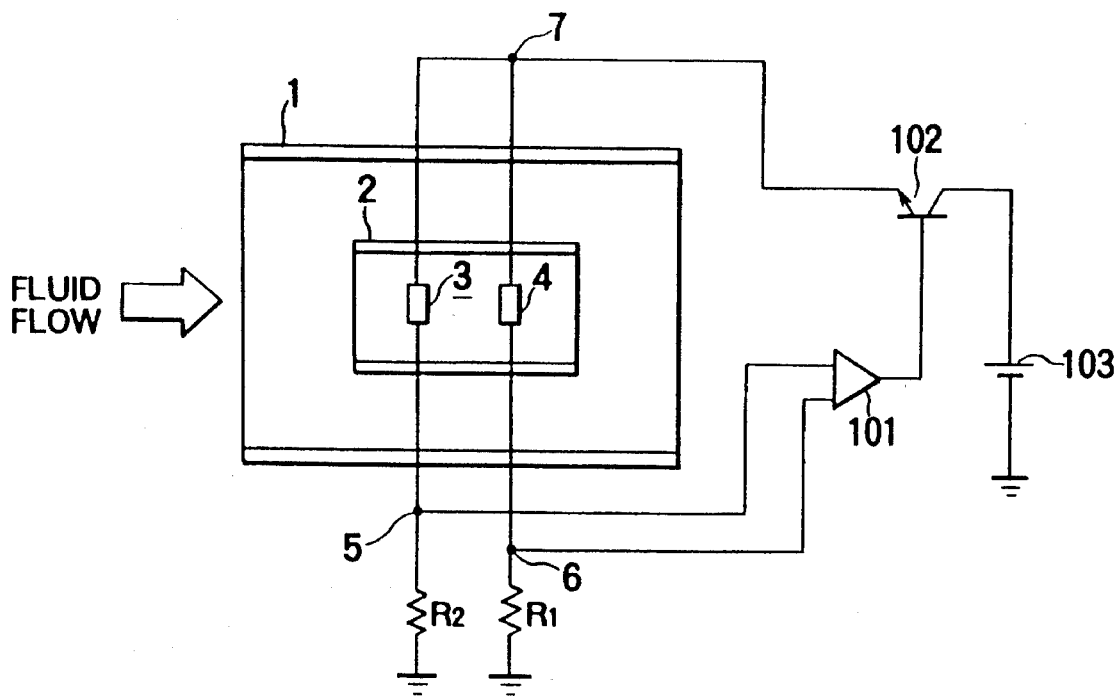
FIG. 11 is a circuit diagram illustrating one example of the thermal flow sensor.

FIGS. 1 and 2 are a front view and a side view, respectively, of a heat-sensitive electrical resistor 21 suitable for use in place of the electrical resistor 3 of the thermal flow sensor illustrated in FIG. 11. The heat-sensitive electrical resistor 21 comprises an elongated base plate 211 made of a suitable electrically insulating ceramic material having a relatively low thermal conductivity such as zirconia which has a thermal conductivity not more than 10 W/m° K. As illustrated, the base plate 211 is arranged to be supported at one end thereof by the detection tube 2 shown in FIG. 11.

The base plate 211 has formed thereon a heat-sensitive resistor element 212 made of a film-shaped layer of a heat-sensitive resistor material which changes with temperature. The heat-sensitive resistor element 212 is a substantially inverted U-shaped film attached on a major surface of the base plate 211. While one of the legs of the "U" is straight, the other leg is winding in a serpentine manner 213 to increase the effective length of the resistor element 212. The bottom ends of the legs of the inverted "U" are provided with a pair of lead lines 214 for allowing an electric current to flow therethrough. The heat-sensitive resistor element 212, together with the base plate, is coated with a protective coating 215.

According to the present invention, the heat-sensitive resistor element 212 comprises a main heat-sensitive section 212A having a first resistance temperature coefficient, and a thermal butter section 212B having a second resistance temperature coefficient greater than the first temperature coefficient, and the thermal buffer section 212B is positioned in the vicinity of the supported end of the base plate 211. In the embodiment illustrated in FIGS. 1 and 2, the main heat-sensitive section 212A is made of an oxide semiconductor material having a negative temperature coefficient of electrical resistance, and the thermal buffer section 212B is made of a resistor material such as platinum or nickel which has a positive temperature coefficient. These two sections 212A and 212B are formed as a continuous integral layer as best seen in FIG. 2.

Figure 3:
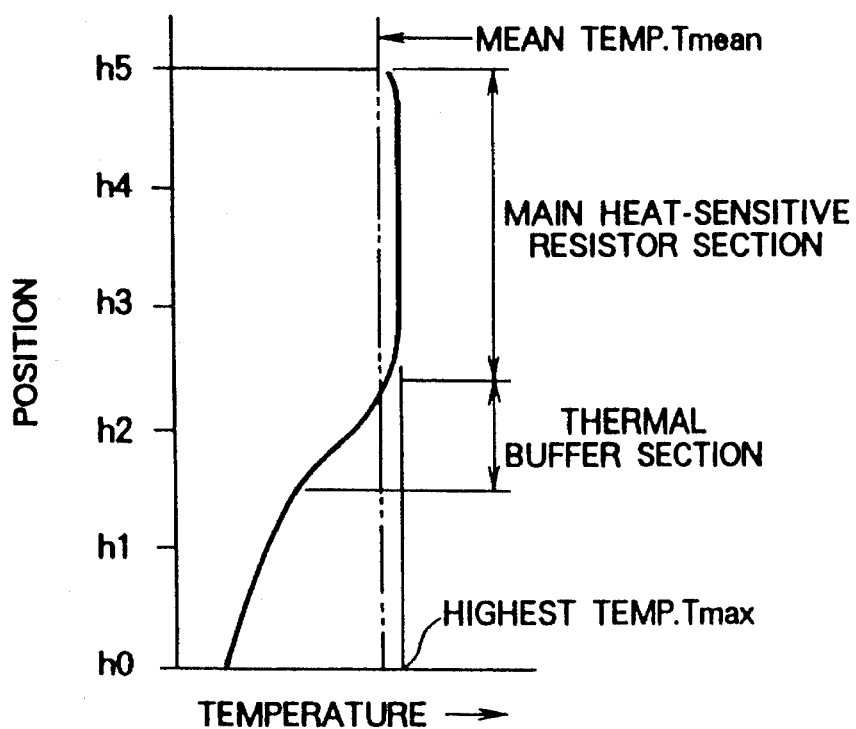
FIG. 3 is a graph illustrating the temperature profile of the heat-sensitive electrical resistor illustrated in FIGS. 1 and 2.

In operation, the electrical resistance of the thermal buffer section 212B having a positive temperature coefficient increases at the high-temperature portion on the side close to the main heat-sensitive section 212A and the heat generates at this portion. Also, the electrical resistance of the main heat-sensitive section 212A having a negative temperature coefficient decreases at its local high-temperature portion and the electrical resistance at the local low-temperature portion increases. Therefore, more heat is generated at the low-temperature portion than the high-temperature portion, whereby the temperature profile of the main heat-sensitive section 212A is uniform and flat. At this time, since the mean temperature $T_{mean}$ of the heat-sensitive resistor 21 is adjusted by the control circuit, the highest temperature $T_{max}$ of the heat-sensitive resistor 21 is not very much higher than the mean temperature $T_{mean}$ as illustrated in FIG. 3. Also, since the zirconia of the support plate 211 has a heat conduction rate of not more than 10 W/m° K., the heat that is conducted from the heat-sensitive resistor 21 to the support structure is relatively small, so that the temperature profile of the main heat-sensitive section 212A can be made further uniform and flat, whereby the local higher temperature $T_{max}$ can be limited to a low level. Therefore, the measurement error due to the thermal radiation can be limited, the change in temperature profile of the heat-sensitive resistor 212 due to the flow speed is small, the time required for the various portions of the resistor to return to its temperature equilibrium state after the flow speed abruptly changes, resulting in a quick response as a thermal flow sensor.

Figure 12:
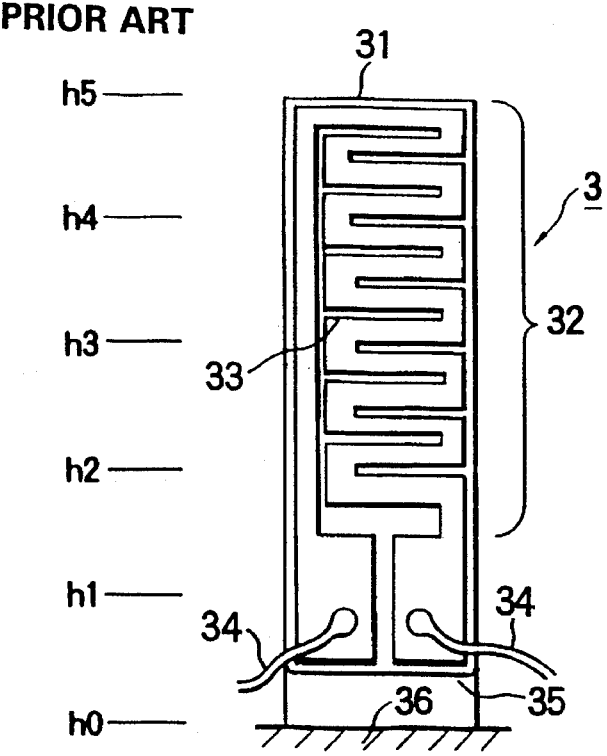
FIG. 12 is a front view of a conventional heat-sensitive electrical resistor used in the thermal flow sensor illustrated in FIG. 11.
Figure 13:
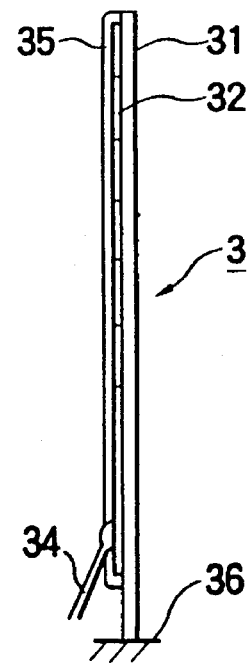
FIG. 13 is a side view of the heat-sensitive electrical resistor illustrated in FIG. 12.
Figure 14:
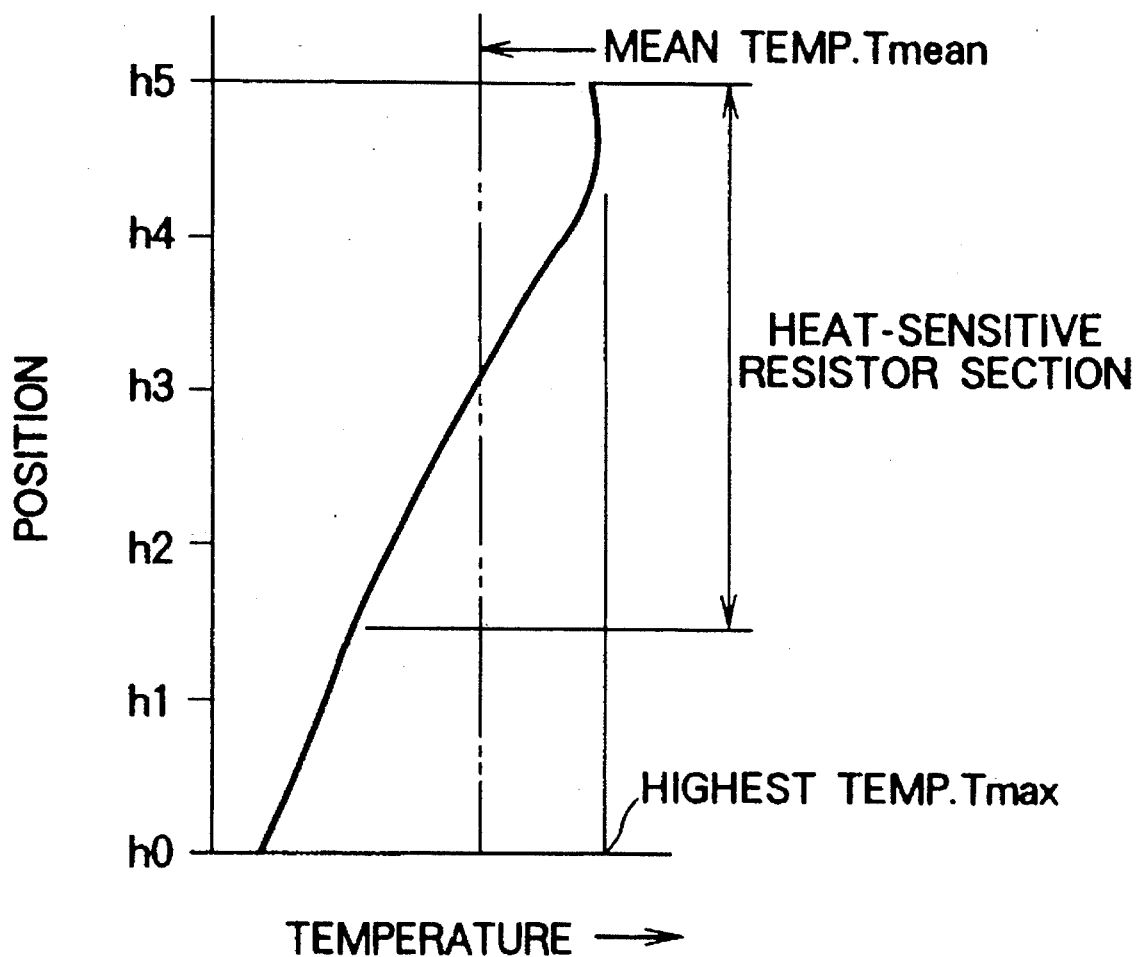
FIG. 14 is e graph illustrating the temperature profile of the heat-sensitive electrical resistor illustrated in FIGS. 12 and 13.

FIG. 3 is a graph illustrating the temperature profile of the heat-sensitive resistor shown in FIGS. 1 and 2. Comparing the graph of FIG. 3 with that of FIG. 14, it is apparent that the temperature of the main heat-sensitive section 212A made of a negative temperature coefficient resistor is substantially uniform and the temperature abruptly changes in the thermal buffer section 212B. It is also seen that the difference between the highest temperature $T_{max}$ and the mean temperature $T_{mean}$ is very small as compared to that of the conventional design illustrated in FIGS. 12 to 14.

Figure 4:
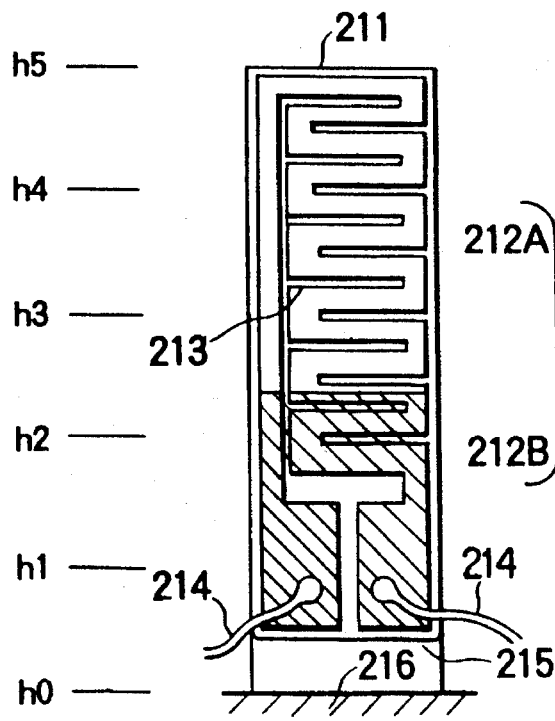
FIG. 4 is a front view of the heat-sensitive electrical resistor of another embodiment of the present invention.
Figure 5:
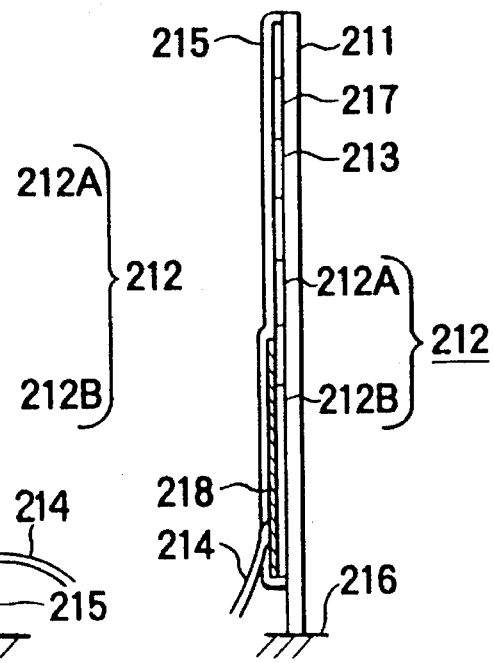
FIG. 5 is a side view of the heat-sensitive electrical resistor illustrated in FIG. 4.

FIGS. 4 and 5 illustrate another embodiment of the thermal flow sensor of the present invention in which the heat-sensitive resistor element 212 comprises a main heat-sensitive section 212A having a first resistance temperature coefficient, and a thermal buffer section 212B having a second resistance temperature coefficient greater than the first temperature coefficient by an amount of about 1,000 ppm or more, It is seen that the main section 212A is formed by a first layer on the entire major surface 217 of the zirconia support plate 211, and the buffer section 212B is formed by a second layer on the lower portion of the support plate In other respects, the structure is similar to that described and illustrated in conjunction with FIGS. 1 and 2.

Figure 6:
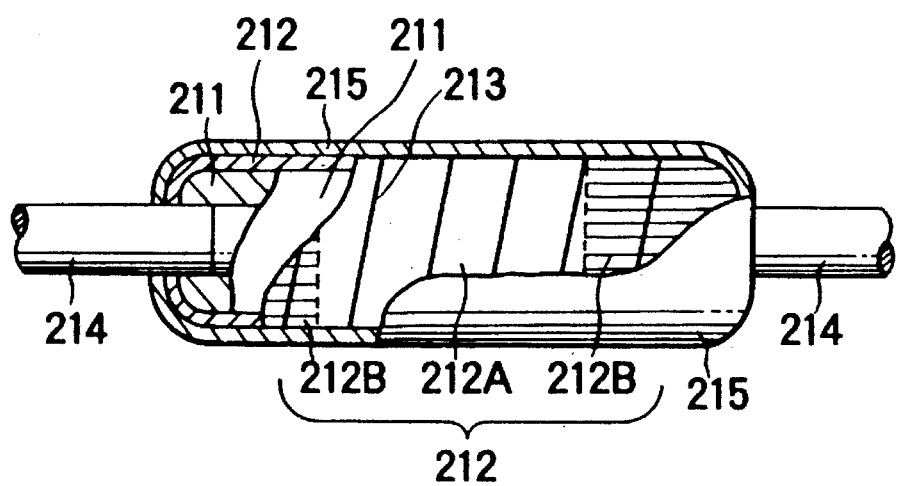
FIG. 6 is a partially cut away side view illustrating the heat-sensitive electrical resistor of still another embodiment of the present invention in which a coil-shaped resistor element is disposed on the support.

FIG. 6 illustrates another embodiment of the heat-sensitive resistor 21 suitable for use in a flow sensor of the present invention which has a generally cylindrical overall configuration supported at opposite ends. The heat-sensitive resistor comprises an electrically insulating base member 211 which is an elongated cylindrical member and a heat-sensitive resistor element 212 is a layer of a resistor material in a shape of a coil wound on the elongated cylindrical base member from one end to another.

The base member 211 is made of zirconia and the coil-shaped resistor element 212 is defined by a spiral-shaped patterning line 213. The resistor element 212 is provided with a pair of lead lines 214 for external connection and the entire resistor 21 is coated with the protective coating 215. The central portion of the heat-sensitive resistor element 212 is the main heat-sensitive section 212A and the thermal buffer sections 212B are provided at and electrically connected to the opposite ends of the main section 212A. The main heat-sensitive section 212A and the thermal buffer sections 212B may either be similar to those described and illustrated in conjunction with FIGS. 1 and 2 as well as FIGS. 4 and 5. It is to be understood that the temperature profile of the resistor element 212 of this embodiment can also be made very flat and uniform.

Figures 7, 8:
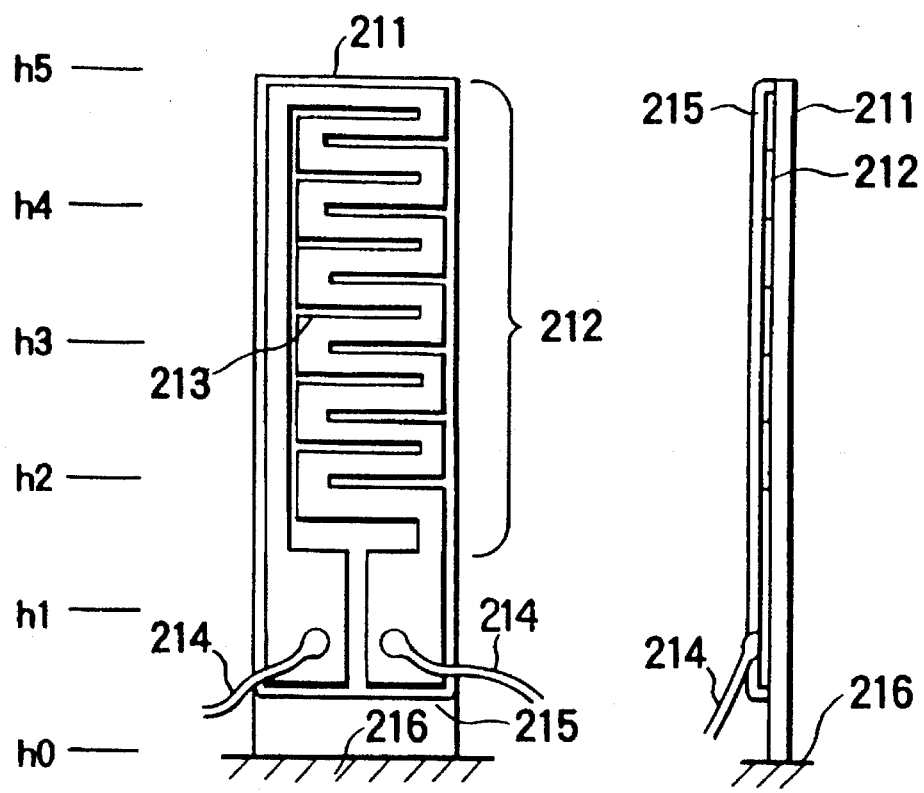
FIG. 7 is a front view of the heat-sensitive electrical resistor of a further embodiment of the present invention.
FIG. 8 is a side view of the heat-sensitive electrical resistor illustrated in FIG. 7.

FIGS. 7 and 8 illustrate a further embodiment of the heat-sensitive electrical resistor for use in a thermal flow sensor of the present invention. The heat-sensitive electrical resistor shown in FIGS. 7 and 8 has a basic structure similar to that described and illustrated in conjunction with FIGS. 1 and 2, the only difference being that all of the heat-sensitive resistor element 212 is made of a material having a negative temperature coefficient such as a metallic oxide semiconductor as previously described. The base plate 211 is made of a ceramic material such as zirconia having a heat conductivity of not more than 10 W/m° K.

In operation, since the heat-sensitive resistor element 212 is entirely made of a resistance material having a negative temperature coefficient, the local resistance of the heat-sensitive resistor element 212 decreases at the high-temperature portion generating a small amount of heat in the high-temperature portion and, on the other hand, the local electrical resistance of the heat-sensitive resistor element 212 increases at its local low-temperature portion, generating a large amount of heat in the low-temperature portion, whereby the temperature difference between the high-temperature portion and the low-temperature portion is decreased and the overall temperature profile of the heat-sensitive resistor element 212 is uniform and flat.

Figure 9:
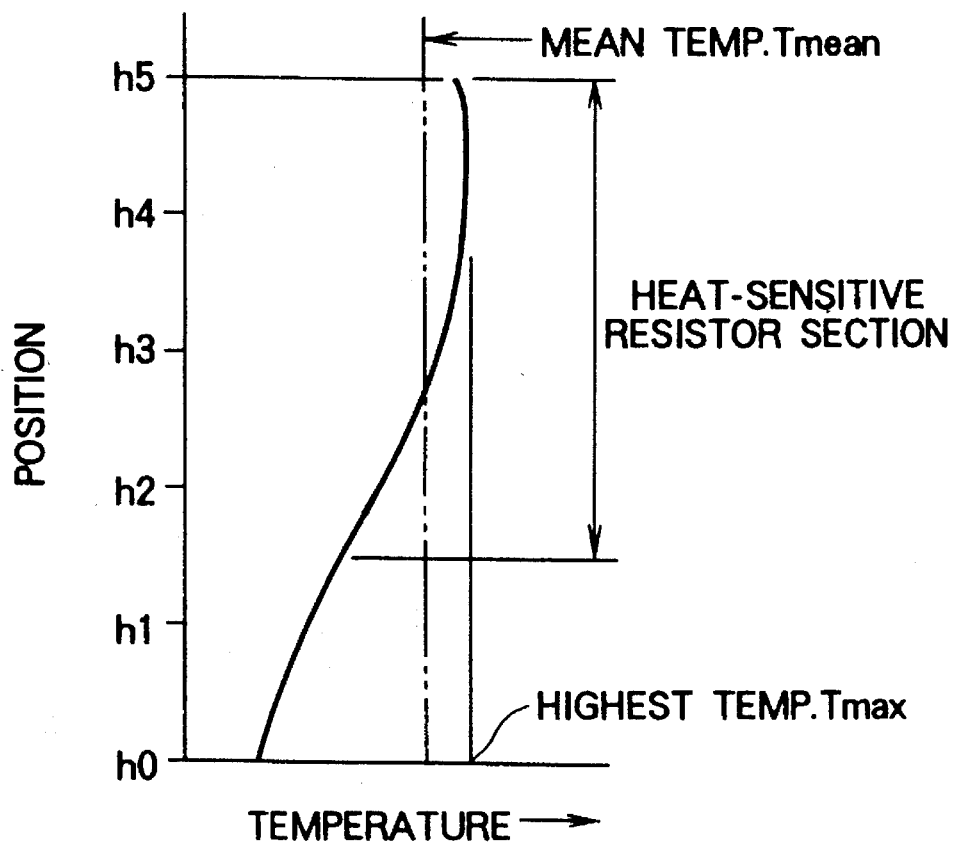
FIG. 9 is a graph illustrating the temperature profile of the heat-sensitive electrical resistor illustrated in FIGS. 7 and 8.

FIG. 9 illustrates the temperature profile obtained by the structure of FIGS. 7 and 8, from which it is seen that since the mean temperature $T_{mean}$ of the heat-sensitive resistor 21 is adjusted by the control circuit the highest temperature $T_{max}$ of the heat-sensitive resistor 21 is not very much higher than the mean temperature $T_{mean}$ as illustrated in FIG. 9. Also, since the zirconia of the support plate 211 has heat conduction rate of not more than 10 W/m° K., the heat that is conducted from the heat-sensitive resistor 21 to the support structure is relatively small, so that the temperature profile of the main heat-sensitive section 212A can be made further uniform and flat, whereby the local higher temperature $T_{max}$ can be limited to a low level. Therefore, the measurement error due to the thermal radiation can be limited, the change in temperature profile of the heat-sensitive resistor 212 due to the flow speed is small, the time required for the various portions of the resistor to return to its temperature equilibrium state after the flow speed abruptly changes, resulting in a quick response as a thermal flow sensor.

Figure 10:
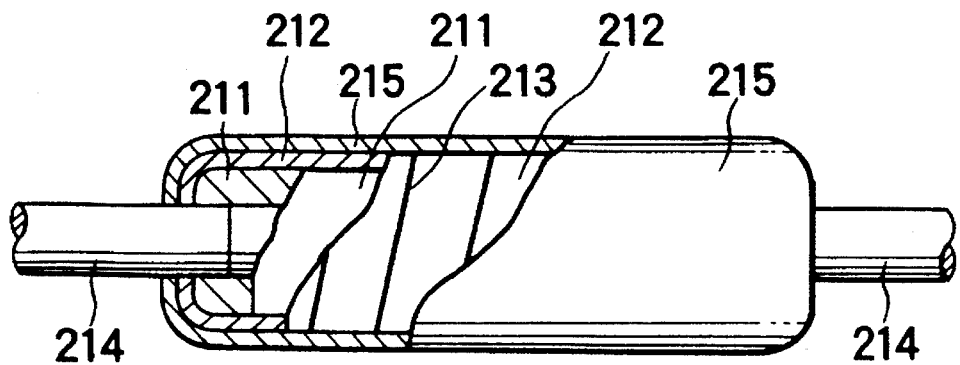
FIG. 10 is a partially cut away side view illustrating the heat-sensitive electrical resistor of another embodiment of the present invention in which a coil-shaped resistor element is disposed on the support.

FIG. 10 illustrates still another embodiment of the heat-sensitive resistor in which the heat-sensitive resistor comprises an electrically insulating base member 211 which is an elongated cylindrical member and a heat-sensitive resistor element 212 which is a layer of a resistor material in a shape of a coil wound on the elongated cylindrical base member from one end to another. The base member 211 is made of zirconia and the coil-shaped resistor element 212 is defined by a spiral-shaped patterning line 213. The resistor element 212 is provided with a pair of lead lines 214 for external connection and the entire resistor 21 is coated with the protective coating 215 to provide a generally cylindrical configuration.

The entire portion of the heat-sensitive resistor element 212 is made of the same negative temperature coefficient material as that described in the embodiment shown in FIGS. 7 to 9 and it is to be easily understood that the temperature profile of the resistor element 212 of this embodiment can also be made very flat and uniform.

As has been described, the thermal flow sensor of the present invention comprises a heat-sensitive electrical resistor having an electrically insulating base member a heat-sensitive resistor element disposed on the support member and having a resistance which changes with temperature at a predetermined temperature coefficient, the heat-sensitive resistor element comprising a main heat-sensitive section having a first resistance temperature coefficient and a thermal buffer section having a second resistance temperature coefficient greater than the first temperature coefficient by at least 1,000 ppm, the thermal butler section being positioned in the vicinity of the support means. The first resistance temperature coefficient may be a negative value and the second resistance temperature coefficient may be a positive value and the base member may be made of zirconia. Alternatively, the thermal flow sensor of the present invention may comprise a heat-sensitive resistor element which has a negative resistance temperature coefficient along its entire length.

Therefore, the temperature difference between the high-temperature portion and the low-temperature portion is small, so that the measurement error due to the heat radiation from the heat-sensitive resistor element can be made small and the the response speed of the thermal flow sensor can be increased.

What is claimed is:

1. A thermal flow sensor, comprising:
    a heat-sensitive electrical resistor comprising an electrically insulating base member and a resistor element disposed thereon, the resistance of which changes with temperature at a predetermined resistance temperature coefficient;
    support means for supporting said base member within a flow stream of a fluid;
    a bridge circuit including said heat-sensitive resistor and a plurality of other resistors; and
    a control circuit for controlling a current in said bridge circuit in such a manner that a predetermined thermal equilibrium state is maintained and for detecting the flow of the fluid from the equilibrium state,
    wherein said resistor element comprises a main section having a negative first resistance temperature coefficient and a buffer section having a positive second resistance temperature coefficient, said buffer section being positioned between said main section and said support means.

2. A thermal flow sensor as claimed in claim 1, wherein said second resistance temperature coefficient is greater than said first resistance temperature coefficient by at least 1,000 ppm.

3. A thermal flow sensor as claimed in claim 1, wherein said heat-sensitive resistor is an elongated member supported by said support means at only one end.

4. A thermal flow sensor as claimed in claim 1, wherein said heat-sensitive resistor is an elongated member supported by said support means at opposite ends.

5. A thermal flow sensor as claimed in claim 1, wherein said base member is made of zirconia.

6. A thermal flow sensor as claimed in claim 1, wherein said main section and said buffer section of said resistor element are resistive layers which are electrically connected together and attached directly on said base member.

7. A thermal flow sensor as claimed in claim 1, wherein said main section and said buffer section of said resistor element are resistive layers, wherein the main section layer extends substantially entirely over said base member and a further layer for said buffer section is attached on said main layer.

8. A thermal flow sensor as claimed in claim 1, wherein said base member is an elongated cylindrical member and said resistor element comprises a coil disposed around said cylindrical base member.

9. A thermal flow sensor for sensing the flow rate of air through an intake passage of an internal combustion engine, comprising:
    a heat-sensitive electrical resistor comprising an electrically insulating base member and a resistor element disposed thereon, the resistance of which changes with temperature at a predetermined resistance temperature coefficient;
    support means for supporting said base member within a flow stream of the intake passage;
    a bridge circuit including said heat-sensitive resistor and a plurality of other resistors; and
    a control circuit for controlling a current in said bridge circuit in such a manner that a predetermined thermal equilibrium state is maintained and for detecting the flow of the air through the intake passage from the equilibrium state,
    wherein said resistor element comprises a main section having a first resistance temperature coefficient and a buffer section having a second resistance temperature coefficient greater than said first resistance temperature coefficient, wherein said buffer section is positioned between said main section and said support means.

10. A thermal flow sensor as recited in claim 9, wherein said second resistance temperature coefficient is greater than said first resistance temperature coefficient by at least 1,000 ppm.

* * * * *